US007344092B1

(12) United States Patent
Kim

(10) Patent No.: US 7,344,092 B1
(45) Date of Patent: Mar. 18, 2008

(54) ROTARY ATOMIZER, AND AIR BEARING PROTECTION SYSTEM FOR ROTARY ATOMIZER

(75) Inventor: Jung Won Kim, #136-1801, Olympic Apt., 89, Bangi 2-dong, Songpa-gu, Seoul (KR)

(73) Assignee: Jung Won Kim, Seoul (KR)

( * ) Notice: Subject to any disclaimer, the term of this patent is extended or adjusted under 35 U.S.C. 154(b) by 0 days.

(21) Appl. No.: 11/682,731

(22) Filed: Mar. 6, 2007

(51) Int. Cl.
*B05B 3/10* (2006.01)
*B05B 3/00* (2006.01)
*B05B 1/28* (2006.01)
*B05B 15/00* (2006.01)
*F16C 32/06* (2006.01)
*F16C 17/10* (2006.01)
*F16C 32/00* (2006.01)

(52) U.S. Cl. .................. 239/223; 239/224; 239/132.3; 239/263.1; 239/290; 384/109; 384/228

(58) Field of Classification Search ................ 239/223, 239/224, 132.3, 263.1, 283, 290, 128, 132, 239/132.1, 214, 214.24, 222.11, 225.1, 226, 239/231, 237, 263.3, 282, 295, 499, 505, 239/518, 524, 699–703, DIG. 14; 384/109, 384/228, 107, 183, 192, 193, 226, 229, 234; 310/90

See application file for complete search history.

(56) References Cited

U.S. PATENT DOCUMENTS

| | | | | |
|---|---|---|---|---|
| 4,378,091 A * | 3/1983 | Morishita et al. | ........... | 239/703 |
| 4,467,968 A * | 8/1984 | Morishita et al. | ........... | 239/703 |
| 4,997,130 A * | 3/1991 | Weinstein | .................. | 239/222 |
| 5,584,435 A * | 12/1996 | Lind | .......................... | 239/73 |
| 6,672,521 B2 * | 1/2004 | Reichler | ..................... | 239/703 |

* cited by examiner

*Primary Examiner*—Darren Gorman
(74) *Attorney, Agent, or Firm*—JHK Law; Joseph Hyosuk Kim

(57) ABSTRACT

Disclosed herein are a rotary atomizer and an air bearing protection system for the rotary atomizer. The structure of the system is simplified to reduce the manufacturing cost. An air bearing is used to enable high-speed rotation along with savings in the maintenance and repair cost. Compressed air can be temporarily supplied at emergency such as interruption of the compressed air. Thus the stability and durability of the entire system are improved, such as prevention of air bearing failure.

9 Claims, 1 Drawing Sheet

ROTARY ATOMIZER, AND AIR BEARING PROTECTION SYSTEM FOR ROTARY ATOMIZER

BACKGROUND OF THE INVENTION

1. Field of the Invention

The present invention relates to a rotary atomizer and an air bearing protection system for the rotary atomizer, and more particularly to, a rotary atomizer and an air bearing protection system for the rotary atomizer, in which the structure is simplified to reduce the manufacturing cost, an air bearing is used to enable high-speed rotation along with savings in the maintenance and repair cost, and compressed air can be temporarily supplied at emergency such as interruption of the compressed air, thereby improving the stability and durability of the entire system such as prevention of air bearing failure.

2. Background of the Related Art

A rotary atomizer refers to a fine liquid-drop spray system. For example, it can be adopted in a semi-dried reactor for removing toxic acidic gas in an incineration process. Here, the rotary atomizer sprays $Ca(OH)_2$, which causes desulphurization reaction, in the form of fine liquid drops to remove $SO_x$. It may be used in a manufacturing process of powders (e.g., ceramics, foods, medicines), where liquid is made into fine liquid-drops which are in turn dried to produce dried powders.

Such a rotary atomizer is disclosed in Japanese Patent Laid-Open Publication No. Hei 7-328489. In this approach, an accelerator is used for enabling high-speed rotation and thus a lot of heat and load are caused upon the continuous operation. In order to remove this heat, lubricating equipment is used, which leads to complexity in the system structure, consequently to difficulties in the maintenance and an increase in the manufacturing cost.

In addition, the input and output shafts are rotatably supported by means of a ball bearing. When in high-speed rotation of above 10,000 RPM, the ball bearing comes to have degraded durability and thus is to be replaced at regular time intervals.

SUMMARY OF THE INVENTION

Accordingly, the present invention has been made in order to solve the above problems occurring in the prior art, and it is an object of the invention to provide a rotary atomizer and an air bearing protection system for the rotary atomizer, in which the structure is simplified to reduce the manufacturing cost, an air bearing is used to enable high-speed rotation along with savings in the maintenance and repair, and compressed air can be temporarily supplied at emergency such as interruption of the compressed air, thereby improving the stability and durability of the entire system such as prevention of air bearing failure.

In order to accomplish the above object, according to one aspect of the invention, there is provided a rotary atomizer comprising: a drive motor including a stator and a rotor; a rotation shaft vertically installed and having a desired length, the rotation shaft being rotated by a rotating force of the rotor; a spray means installed at a lower end portion of the rotation shaft for spraying externally-supplied liquid into the form of fine particles; and a shaft support means for connecting the upper end of the rotation shaft and the rotor with each other so as to enable power transmission and rotatably supporting the rotation shaft, wherein the shaft support means includes: an upper thrust for connecting the upper end portion of the rotation shaft and the rotor with each other such that rotating force of the rotor is transmitted to rotate the rotation shaft; a lower thrust fixed to the rotation shaft so as to be spaced apart downwardly from the upper thrust; a rotation shaft guide means having a rotation shaft guide body, a journal-side air bearing installed vertically over the entire inner face of an installation hole vertically passing through the center of the rotation shaft guide body so as to form a shaft rotation support hole, an upper and lower thrust-side air bearing installed in depressed spaces formed in outer peripheral areas of the shaft rotation support hole in the top and bottom faces of the rotation shaft guide body 43*a* so as to correspond to the bottom face and top face of the upper and lower thrusts respectively, and a rotation shaft guide means installed so as to enable to move in vertical direction with respect to the rotation shaft corresponding to between the upper and lower thrusts and so as to allow the rotation shaft corresponding to between the upper and lower thrusts to be rotatably inserted into the shaft rotation support hole; and a compressed air inlet/exhaust means having a compressed air inlet port formed at the outer side of the rotation shaft guide body for allowing compressed air to be flown into the journal-side air bearing and the upper and lower thrust-side air bearings, and a compressed air exhaust port configured to exhaust the compressed air flown into the journal-side air bearing and the upper end and lower thrust-side air bearings.

According to another aspect of the invention, there is provided an air bearing protection system comprising: a drive motor including a stator and a rotor; a rotation shaft vertically installed and having a desired length, the rotation shaft being rotated by a rotating force of the rotor; a spray means installed at a lower end portion of the rotation shaft for spraying externally-supplied liquid into the form of fine particles; and a shaft support means for connecting the upper end of the rotation shaft and the rotor with each other so as to enable power transmission and rotatably supporting the rotation shaft, wherein the shaft support means includes: an upper thrust for connecting the upper end portion of the rotation shaft and the rotor with each other such that rotating force of the rotor is transmitted to rotate the rotation shaft; a lower thrust fixed to the rotation shaft so as to be spaced apart downwardly from the upper thrust; a rotation shaft guide means having a rotation shaft guide body, a journal-side air bearing installed vertically over the entire inner face of an installation hole vertically passing through the center of the rotation shaft guide body so as to form a shaft rotation support hole, an upper and lower thrust-side air bearing installed in depressed spaces formed in outer peripheral areas of the shaft rotation support hole in the top and bottom faces of the rotation shaft guide body 43*a* so as to correspond to the bottom face and top face of the upper and lower thrusts respectively, and a rotation shaft guide means installed so as to enable to move in vertical direction with respect to the rotation shaft corresponding to between the upper and lower thrusts and so as to allow the rotation shaft corresponding to between the upper and lower thrusts to be rotatably inserted into the shaft rotation support hole; and a compressed air inlet/exhaust means having a compressed air inlet port formed at the outer side of the rotation shaft guide body for allowing compressed air to be flown into the journal-side air bearing and the upper and lower thrust-side air bearings, and a compressed air exhaust port configured to exhaust the compressed air flown into the journal-side air bearing and the upper end and lower thrust-side air bearings; a compressed air supply means for supplying compressed air into the compressed air inlet port; a sensor detecting flow rate of the compressed air being supplied by the compressed air supply means; a compressed air storage tank connected to the compressed air inlet port and having an electric shutter valve attached thereto; and a control means determining the flow rate from the sensor of the compressed air, which is supplied by the compressed air supply means and, if the determined flow rate is below the pre-set value, controlling the electronic shutter valve to be opened, thereby allowing compressed air in the compressed air storage tank to flow into the compressed air inlet port.

According to the present invention, the structure of the system can be simplified to reduce the manufacturing cost, an air bearing is used to enable high-speed rotation along with savings in the maintenance and repair cost, and compressed air can be temporarily supplied at emergency such as interruption of the compressed air, thereby improving the stability and durability of the entire system such as prevention of air bearing failure.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
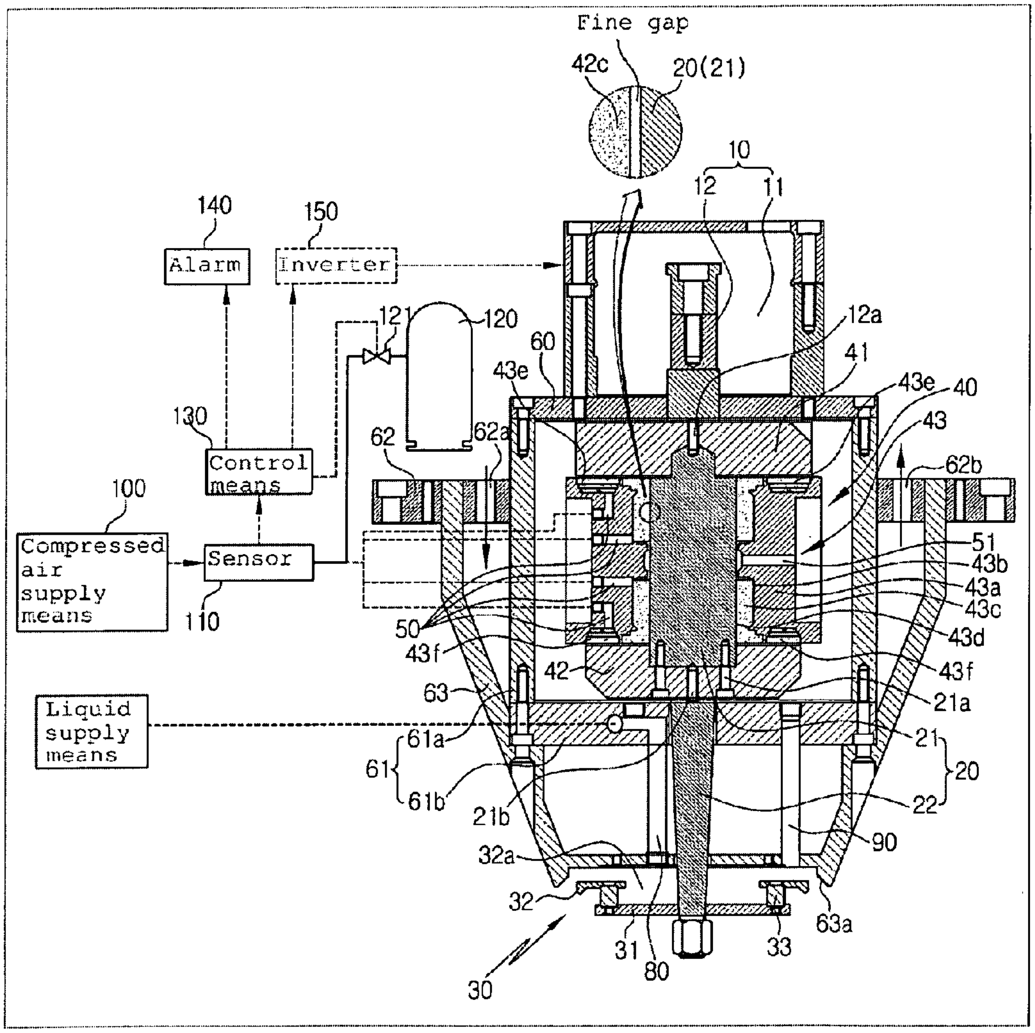
FIG. 1 is a sectional view showing a rotary atomizer and an air-bearing protection system according to an embodiment of the invention.

Reference will now be made in detail to the preferred embodiments of the present invention, examples of which are illustrated in the accompanying drawings.

FIG. 1 is a sectional view showing a rotary atomizer and an air-bearing protection system according to an embodiment of the invention.

The rotary atomizer according to an embodiment of the invention includes a drive motor 10 having a stator 11 and a rotor 12, and a rotation shaft 20 being rotated by means of rotating force of the rotor 12. The rotation shaft 20 has a desired length and installed in vertical direction. A spray means 30 is disposed at the lower end portion of the rotation shaft 20 and sprays externally-supplied liquid into a state of fine particles. A shaft support means 40 is connected to the upper end of the rotation shaft 20 so as to transmit power of the rotor 12 and also rotatably support the rotation shaft 20.

According to an embodiment of the invention, the shaft support means 40 includes an upper thrust 41, a lower thrust 42, a rotation shaft guide means 43 and a compressed air inlet/exhaust means.

Here, as an example, the rotation shaft 20 of the invention includes an upper rotation shaft 21 installed between the upper thrust 41 and the lower thrust 42, and a lower rotation shaft 22 extended from the lower portion of the lower thrust 42.

The upper thrust 41 has a circular shape in the transversal cross-section thereof. The upper thrust 41 interconnects the upper end portion of the rotation shaft 20, i.e., the upper portion of the upper rotation shaft 21 of the rotation shaft 20 and the rotor 12, such that rotating force of the rotor 12 can be transmitted to rotate the rotation shaft 20.

More specifically, a connection bolt 12*a* protruded at the lower portion of the rotor 12 passes through the center of the upper thrust 41 and then is thread-fastened to the upper end portion of the rotation shaft 20, i.e., the upper end of the upper rotation shaft 21 forming the rotation shaft 20. Thus, the rotor 12 and the rotation shaft 20 are interconnected with each other.

On the other hand, the lower thrust 42 is fixed to the lower end portion of the upper rotation shaft 21, which constitutes the rotation shaft 20 and is spaced apart downwardly from the upper thrust 41.

That is, the lower thrust 42 and the upper rotation shaft 21 forming a rotation shaft 20 are interconnected by means of a connection bolt 21*a*.

In this embodiment, the rotation shaft 20 has been illustrated as having an upper rotation shaft 21 and a lower rotation shaft 22. The upper and lower rotation shafts 21 and 22 may be integrally formed. In this case, the lower thrust 42 can be fixed to the outer face of the rotation shaft 20 using welding or the like.

In addition, the lower rotation shaft 22 is connected to the lower thrust 42 by means of a separate connection bolt 21*b*.

On the other hand, the rotation shaft guide means 43 includes a rotation shaft guide body 43*a*. A journal-side air bearing 43*c* is vertically installed in an installation hole 43*b* over the whole inner face thereof. The installation hole 43*b* is formed in the center of the rotation shaft guide body 43*a* so as to pass through the body 43*a* in vertical direction. The journal-side air bearing 43*c* forms a shaft rotation support hole 43*d* in the center in vertical direction. Upper and lower thrust-side air bearings 43*e* and 43*f* are installed in upper and lower depressed spaces respectively. The upper and lower depressed spaces are formed in the outer peripheral area of the shaft rotation support hole 43*d* in the upper and lower faces of the rotation shaft guide body 43*a* so as to correspond to the upper and lower faces respectively of the upper and lower thrusts 41 and 42. The rotation shaft 20 between the upper and lower thrusts 41 and 42 is rotatably inserted into the shaft rotation hole 43*d* so as to be movable up and down with respect to the rotation shaft 20 between the upper and lower thrusts 41 and 42.

The compressed air inlet/exhaust means includes a compressed air inlet port 50 and a compressed air exhaust port 51. The compressed air inlet port 50 is formed outside of the rotation shaft guide body 43*a* and allows compressed air to flow into the journal-side air bearing 43*c* and the upper and lower thrust-side air bearings 43*e* and 43*f*. The compressed air exhaust port 51 allows the in-flown compressed air to be exhausted towards the journal-side air bearing 43*c* and the upper and lower thrust-side air bearings 43*e* and 43*f*.

Here, the journal-side air bearing 43*c* and thrust-side air bearings 43*e* and 43*f* are formed to have a fine passageway inside. If compressed air is supplied from the compressed air inlet port 50, it is erupted through the fine passageway formed inside of the air bearings 43*c*, 43*e* and 43*f*. Such air bearings are well-known and thus details thereon will not be described here.

Here, the journal-side air bearing 43*c* and the upper and lower thrust-side air bearings 43*e* and 43*f* can employ any one of an orifice bearing, a carbon-material bearing and a ceramic-material bearing.

In the present invention, air in-flown through the compressed air inlet port 50 is exhausted through the compressed air exhaust port 51. This air flowing path will be explained hereafter.

First, when compressed air is introduced through the compressed air inlet port 50, air flown into the inside of the journal-side air bearing 43*c* passes through the inside of the journal-side air bearing 43*c* and thereafter is ejected through a fine gap between the inner circumference of the journal-side air bearing 43*c* and the outer circumference of the upper rotation shaft 21 forming the rotation shaft 20. Then, it is exhausted through the compressed air exhaust port 51 while forming an air layer to prevent friction between the rotation shaft 20 and the inner face of the journal-side air bearing 43*c*.

In the present invention, the journal-side air bearing 43*c* is divided into an upper journal-side air bearing and a lower journal-side air bearing, which are formed at the upper and lower portions of the rotation shaft guide body 43*a* respectively excepting the intermediate portion thereof. Therefore, the compressed air passing through the inside of the upper and lower journal-side air bearings is collected at the central portion of the rotation shaft guide body 43*a* and finally exhausted through the compressed air exhaust port 51.

Here, formed between the inner face of the intermediate portion of the rotation shaft guide body 43*a* and the outer face of the upper rotation shaft 21 is a fine gap through which air can move into the compressed air exhaust port 51.

In this way, the rotation shaft 20 can be smoothly rotated by means of the journal-side air bearing 43*c*.

On the other hand, compressed air in-flown through the compressed air inlet port 50 is supplied into the upper and lower thrust-side air bearing 43*e* and 43*f*. The compressed air supplied into the upper and lower thrust-side air bearing 43*e* and 43*f* passes through the inside thereof and then is collided with the top and bottom faces of the upper and lower thrusts 41 and 42 respectively. Therefore, due to the force of the air colliding the upper and lower thrusts 41 and 42, the rotation shaft guide body 43*a* slightly slides in axial direction with respect to the upper rotation shaft 21 forming the rotation shaft 20. In this way, a fine gap is formed and maintained between the top face of the upper thrust-side air bearing 43*e* and the bottom face of the upper thrust 41, and also a fine gap is formed and maintained between the bottom face of the lower thrust-side air bearing 43*f* and the top face of the lower thrust 42.

Therefore, an air layer is formed in the fine gap between the top face of the upper thrust-side air bearing 43*e* and the bottom face of the upper thrust 41, and between the bottom face of the lower thrust-side air bearing 43*f* and the top face of the lower thrust 42. Thus, due to the air layer, the upper and lower thrust 41 and 42 can be smoothly rotated at high speed, along with the rotation shaft 20.

On the other hand, the above-mentioned top face of the upper journal-side air bearing 43*c* and the bottom face of the lower journal-side air bearing 43*c* also form a fine gap with the upper and lower thrusts 41 and 42. An air layer is formed through this fine gap, due to supply of compressed air.

As described above, air of the above-formed air layer moves into the fine gap between the inner circumference of the journal-side air bearing and the outer circumference of the upper rotation shaft 21 forming the rotation shaft 20, and thereafter is exhausted through the compressed air exhaust port 51.

As described above, if a power is applied to the drive motor 10 and the rotor 12 rotates at a high speed, the rotation shaft 20 receiving rotating face of the rotor 12 can rotate at a high-speed, due to operation of the shaft support means 40.

Here, the drive motor 10 used in the invention employs a high-frequency motor stator as the stator 11 and adopts a high-frequency motor rotor as the rotor 12, thereby enabling to rotate the rotation shaft 20 with a high-speed of 6,000 to 24,000 RPM.

In addition, the rotation shaft 20 of the invention is configured to be rotatably supported in the direction of journal and thrust, and simultaneously an air bearing is employed, instead of the conventional ball bearing. Thus, the rotation shaft 20 can be rotated with a high speed for a longer period of time, without failure.

Further, the air bearing adopted in the invention has an extended service life, dissimilar to the conventional ball bearing, thereby enabling to use the system semi-permanently.

Thus, the rotation shaft 20 of the invention can be rotated at a high-speed such that liquid externally supplied is sprayed in the form of fine particles through the spray means 30.

On the other hand, the spray means 30 includes: a lower plate 31 forcibly inserted onto the outer circumference of the rotation shaft 20; an upper plate 32 disposed at a position spaced apart by a certain distance upwardly from the lower plate 31 so as to surround the rotation shaft 20, and having a liquid charge hole 32*a* formed at the center thereof such that a certain gap is formed between the outer face of the rotation shaft 20 and the inner face of the upper plate 32; and a column member 33 installed in multiple numbers between facing edge areas of the upper and lower plates 32 and 31 in such a way that the upper end of the column member is connected to the upper plate 32 and the lower end thereof is connected to the lower plate 32, such that liquid charged through the liquid charge hole 32*a* of the upper plate 32 can be collided to be sprayed in the form of fine particles.

Here, the liquid denotes in general $Ca(OH)_2$ used for desulphurization reaction in a semi-drier reactor or ones used for manufacturing ceramics, foods and medicines. The liquid is supplied through a liquid supply pipe 80 formed in the bottom plate 61*b* constituting a first protection case 61, which will be described hereafter, but not limited thereto. The liquid may be charged into a liquid charge hole 32*a* of the upper plate 32 through other paths.

On the other hand, the present invention may further comprise a drive motor mounting plate 60 placed at an upper side of the shaft support means 40 to install the drive motor 10; a first protection case 61 including a sidewall plate 61*a* installed downwardly from the drive motor mounting plate 60 so as to house and protect the shaft support means 40, and a bottom plate 61*b*; a bracket 62 installed in the sidewall plate 61*a* of the first protection case 61 and combined with a chamber; and a second protection case 63 connected at an upper end thereof to a bottom face of the bracket 62 to house and protect the first protection case 61 except for the spray means 30 and the rotation shaft 20 protruded from the first protection case 61.

That is, as described above, the first and second protection cases 63 are provided in order that, in case where a chamber where the atomizer of the invention is installed has a high internal temperature, the components of the atomizer are prevented from being degraded due to the high temperature heat.

On the other hand, according to the invention, in order to protect the chamber where the atomizer is installed, when it is a high-temperature, a cooling water inlet port 62*a* is formed at one side of the bracket 62 and a cooling water discharge port 62*b* is formed at the other side of the bracket 62, such that cooling water in-flown through the cooling water inlet port 62*a* flows through a space between the second and first protection cases 63 and 61 and is discharged through the cooling water discharge port 62*b*.

In addition, the spray means 30 is installed so as to be spaced apart from the bottom face of the second protection case 63 by a fine spacing, and a tapered face 63*a* is formed at an edge area of the bottom face of the second protection case 63 so as to guide air downwardly, such that air is supplied into a spacing between the spray means 30 and the second protection case 63 and flows along the tapered face 63*a* to form a conical air curtain and thus fin particles sprayed by the spray means 30 are guided to be spread downwardly.

Here, air is supplied through an air supply pipe 90 formed in the bottom plate 61*b* forming the first protection case 61, but not limited thereto. The air may be supplied into the spacing between the spay means 30 and the second protection case 63 through other paths.

The construction of a rotary atomizer according to an embodiment has been described as above.

Hereafter, a system for protecting the air bearing at an emergency where compressed air is not supplied into the basic structure of the rotary atomizer of the invention, i.e., the rotary atomizer recited in appended claim 1. However, it should be noted that the protection system of the invention is not limited to the claim 1, but applied to the entire construction of rotary atomizer embodied according to the invention.

At an emergency case where compressed air is not supplied or supplied at a flow rate no more than a pre-set value, the air bearing protection system of the invention supplies no air into the journal-side air bearing 43*c* and the upper and lower thrust-side air bearings 43*e* and 43*f*, or supplies air at a flow rate below the pre-set value.

In this case, dissimilar to the case where compressed air is supplied through a fine gap between the top face of the upper thrust-side air bearing 43*e* and the bottom face of the upper thrust 41 and a fine gap between the bottom face of the lower thrust-side air bearing 43*f* and the top face of the lower thrust 42, the rotation shaft guide body 43*a* descends by its own gravity, and thus the entire lower thrust-side air bearing 43*f* and part of the bottom face of the lower journal-side air bearing 43*c* cause friction with the top face of the lower thrust 42. Consequently, the lower thrust-side air bearing 43*f* and the lower journal-side air bearing 43*c* result in failure or abrasion.

Therefore, in order to protect these air bearings, the present invention comprises: a compressed air supply means 100 for supplying compressed air into the compressed air inlet port 50; a sensor 110 for detecting flow rate of the compressed air being supplied by the compressed air supply means 100; a compressed air storage tank 120 connected to the compressed air inlet port 50 and having an electric shutter valve 121 attached thereto; and a control means 130 for determining the flow rate from the sensor 110 of the compressed air, which is supplied by the compressed air supply means 100 and, if the determined flow rate is below the pre-set value, controlling the electronic shutter valve 121 to be opened, thereby allowing compressed air in the compressed air storage tank 120 to flow into the compressed air inlet port 50.

Here, the compressed air storage tank 120 is filled with compressed air. When the electronic shutter valve 121 is opened, automatically the compressed air filled inside the storage tank 120 flows into the compressed air inlet port 50 by means of its pressure and forms an air layer in the fine gap between the top face of the upper thrust-side air bearing 43*e* and the bottom face of the upper thrust 41 and in the fine gap between the bottom face of the lower thrust-side air bearing 43*f* and the top face of the lower thrust 42.

On the other hand, the present invention further comprises an alarm 140 configured such that the control means 130 determines the flow rate of compressed air being supplied from the compressed air supply means 100 and, if the determined flow rate is below the pre-set value, the alarm operates to allow an operator to be noticed.

In this way, the operator can immediately stop operation of the drive motor 10, thereby enabling to avoid further abrasion or failure of the air bearings.

On the other hand, according to the invention, instead of the operator's manual interruption of the driver motor 10, the control means 130 may determine the flow rate of compressed air being supplied from the compressed air supply means 100, and if the determined flow rate is below the pre-set value, the electronic shutter valve 121 is opened to allow the air in the compressed air storage tank 120 to flow into the compressed air inlet port 50, at which time, the speed of the rotor 12 of the drive motor 10 is slowly reduced using an inverter 150.

As apparent from the foregoing, in the present invention, the structure of the system can be simplified to reduce the manufacturing cost, an air bearing is used to enable high-speed rotation along with savings in the maintenance and repair cost, and compressed air can be temporarily supplied at emergency such as interruption of the compressed air, thereby improving the stability and durability of the entire system such as prevention of air bearing failure.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A rotary atomizer comprising:

a drive motor including a stator and a rotor;

a rotation shaft vertically installed and having a desired length, the rotation shaft being rotated by a rotating force of the rotor;

a spray means installed at a lower end portion of the rotation shaft for spraying externally-supplied liquid into the form of fine particles; and a shaft support means for connecting an upper end of the rotation shaft and the rotor with each other so as to enable power transmission and for rotatably supporting the rotation shaft, wherein the shaft support means includes:

an upper thrust for connecting the upper end portion of the rotation shaft and the rotor with each other such that rotating force of the rotor is transmitted to rotate the rotation shaft;

a lower thrust fixed to the rotation shaft so as to be spaced apart downwardly from the upper thrust;

a rotation shaft guide means having a rotation shaft guide body, a journal-side air bearing installed vertically over the entire inner face of an installation hole vertically passing through the center of the rotation shaft guide body so as to form a shaft rotation support hole, an upper and a lower thrust-side air bearing installed in depressed spaces formed in outer peripheral areas of the shaft rotation support hole in a top and a bottom face of the rotation shaft guide body so as to directly oppose a bottom face and a top face of the upper and lower thrusts, respectively, the rotation shaft guide means being installed so as to enable the rotation shaft guide means to move in a vertical direction with respect to the rotation shaft between the upper and lower thrusts and so as to allow the rotation shaft between the upper and lower thrusts to be rotatably inserted into the shaft rotation support hole; and a compressed air inlet/exhaust means having a compressed air inlet port formed at an outer side of the rotation shaft guide body for allowing compressed air to be flown into the journal-side air bearing and the upper and lower thrust-side air bearings, and a compressed air exhaust port for exhausting the compressed air flown into the journal-side air bearing and the upper and lower thrust-side air bearings.

2. The rotary atomizer as claimed in claim 1, wherein the journal-side air bearing and the upper and lower thrust-side air bearings include any one of an orifice bearing, a carbon-material bearing and a ceramic-material bearing.

3. The rotary atomizer as claimed in claim 1, wherein the spray means includes:

a lower plate forcibly inserted onto the outer circumference of the rotation shaft;

an upper plate disposed at a position spaced apart by a certain distance upwardly from the lower plate so as to surround the rotation shaft, the upper plate having a liquid charge hole formed at the center thereof such that a certain gap is formed between the outer face of the rotation shaft and the inner face of the upper plate; and a column member installed in multiple numbers between facing edge areas of the upper and lower plates in such a way that the upper end of the column member is connected to the upper plate and the lower end thereof is connected to the lower plate, such that liquid charged through the liquid charge hole of the upper plate can be sprayed in the form of fine particles.

4. The rotary atomizer as claimed in claim 1, further comprising:

a drive motor mounting plate placed at an upper side of the shaft support means to install the drive motor;

a first protection case including a sidewall plate installed downwardly from the drive motor mounting plate so as to house and protect the shaft support means, and a bottom plate;

a bracket installed in the sidewall plate of the first protection case; and a second protection case connected at an upper end thereof to a bottom face of the bracket to house and protect the first protection case, except for the spray means and the rotation shaft, which protrude from the first protection case.

5. The rotary atomizer as claimed in claim 4, wherein a cooling water inlet port is formed at one side of the bracket and a cooling water discharge port is formed at an opposing side of the bracket, such that cooling water in-flown through the cooling water inlet port flows through a space between the second and first protection cases and is discharged through the cooling water discharge port.

6. The rotary atomizer as claimed in claim 4 or 5, wherein the spray means is installed so as to be spaced apart from a bottom face of the second protection case by a fine spacing, and a tapered face is formed at an edge area of the bottom face of the second protection case so as to guide air downwardly, such that air is supplied into a spacing between the spray means and the second protection case and flows along the tapered face to form a conical air curtain and thus fine particles sprayed by the spray means are guided to be spread downwardly.

7. An air bearing protection system comprising:

a drive motor including a stator and a rotor; a rotation shaft vertically installed and having a desired length, the rotation shaft being rotated by a rotating force of the rotor; a spray means installed at a lower end portion of the rotation shaft for spraying externally-supplied liquid into the form of fine particles; and a shaft support means for connecting an upper end of the rotation shaft and the rotor with each other so as to enable power transmission and for rotatably supporting the rotation shaft, wherein the shaft support means includes: an upper thrust for connecting the upper end portion of the rotation shaft and the rotor with each other such that rotating force of the rotor is transmitted to rotate the rotation shaft; a lower thrust fixed to the rotation shaft so as to be spaced apart downwardly from the upper thrust; a rotation shaft guide means having a rotation shaft guide body, a journal-side air bearing installed vertically over the entire inner face of an installation hole vertically passing through the center of the rotation shaft guide body so as to form a shaft rotation support hole, an upper and a lower thrust-side air bearing installed in depressed spaces formed in outer peripheral areas of the shaft rotation support hole in a top and a bottom face of the rotation shaft guide body so as to directly oppose a bottom face and a top face of the upper and lower thrusts, respectively, the rotation shaft guide means being installed so as to enable the rotation shaft guide means to move in a vertical direction with respect to the rotation shaft between the upper and lower thrusts and so as to allow the rotation shaft between the upper and lower thrusts to be rotatably inserted into the shaft rotation support hole; and a compressed air inlet/exhaust means having a compressed air inlet port formed at an outer side of the rotation shaft guide body for allowing compressed air to be flown into the journal-side air bearing and the upper and lower thrust-side air bearings, and a compressed air exhaust port configured to exhaust the compressed air flown into the journal-side air bearing and the upper and lower thrust-side air bearings, a compressed air supply means for supplying compressed air into the compressed air inlet port;

a sensor for detecting flow rate of the compressed air being supplied by the compressed air supply means;

a compressed air storage tank connected to the compressed air inlet port and having an electric shutter valve attached thereto; and a control means for determining the flow rate from the sensor of the compressed air, which is supplied by the compressed air supply means and, if the determined flow rate is below a pre-set value, the control means opens the electronic shutter valve, thereby allowing compressed air in the compressed air storage tank to flow into the compressed air inlet port.

8. The system as claimed in claim 7, further comprising an alarm configured such that when the control means determines that the flow rate of compressed air being supplied from the compressed air supply means is below the pre-set value, the alarm operates to allow an operator to be noticed.

9. The system as claimed in claim 7, wherein, when the control means determines the flow rate of compressed air being supplied from the compressed air supply means, and when the determined flow rate is below the pre-set value, and the electronic shutter valve is opened to allow the air in the compressed air storage tank to flow into the compressed air inlet port, the speed of the rotor of the drive motor is slowly reduced using an inverter.

* * * * *